United States Patent
Lorenz et al.

(10) Patent No.: US 9,371,885 B2
(45) Date of Patent: Jun. 21, 2016

(54) ROTATIONAL VIBRATION DAMPING ARRANGEMENT FOR THE DRIVE TRAIN OF A VEHICLE

(71) Applicants: Daniel Lorenz, Bad Kissingen (DE); Tobias Höche, Hofheim i. UFr. (DE); Thomas Dögel, Nuedlingen (DE)

(72) Inventors: Daniel Lorenz, Bad Kissingen (DE); Tobias Höche, Hofheim i. UFr. (DE); Thomas Dögel, Nuedlingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/414,573

(22) PCT Filed: Jun. 18, 2013

(86) PCT No.: PCT/EP2013/062554
§ 371 (c)(1),
(2) Date: Jan. 13, 2015

(87) PCT Pub. No.: WO2014/012726
PCT Pub. Date: Jan. 23, 2014

(65) Prior Publication Data
US 2015/0192190 A1 Jul. 9, 2015

(30) Foreign Application Priority Data
Jul. 18, 2012 (DE) .......... 10 2012 212 593

(51) Int. Cl.
*F16F 15/131* (2006.01)
*F16F 15/14* (2006.01)
*F16D 3/66* (2006.01)
*F16F 15/134* (2006.01)
*F16F 15/12* (2006.01)

(52) U.S. Cl.
CPC ............ *F16F 15/13157* (2013.01); *F16D 3/66* (2013.01); *F16F 15/13484* (2013.01); *F16F 15/145* (2013.01); *F16D 2300/06* (2013.01); *F16F 15/1206* (2013.01)

(58) Field of Classification Search
CPC ..................... F16F 15/13157; F16F 15/13484; F16F 15/145; F16F 15/1206; F16F 15/1464; F16F 15/1478; F16D 3/12; F16D 3/66; F16D 2300/06; F16D 2300/22; F16D 2300/26; F16H 55/14
See application file for complete search history.

*Primary Examiner* — Jacob S Scott
(74) *Attorney, Agent, or Firm* — Cozen O'Connor

(57) ABSTRACT

A torsional vibration damping arrangement for the drivetrain of a vehicle includes an input region to be driven in rotation around an axis of rotation (A) and an output region, and a first torque transmission path and parallel thereto a second torque transmission path which proceed from the input region, and a coupling arrangement for superposing the torques guided via the torque transmission paths, which coupling arrangement communicates with the output region, and a phase shifter arrangement for the first torque transmission path for generating a phase shift of rotational irregularities guided via the first torque transmission path relative to rotational irregularities guided via the second torque transmission path. The torsional vibration damping arrangement is formed with an axial distance between the phase shifter arrangement and the coupling arrangement to form a passage space for at least one driveshaft of a vehicle.

20 Claims, 8 Drawing Sheets

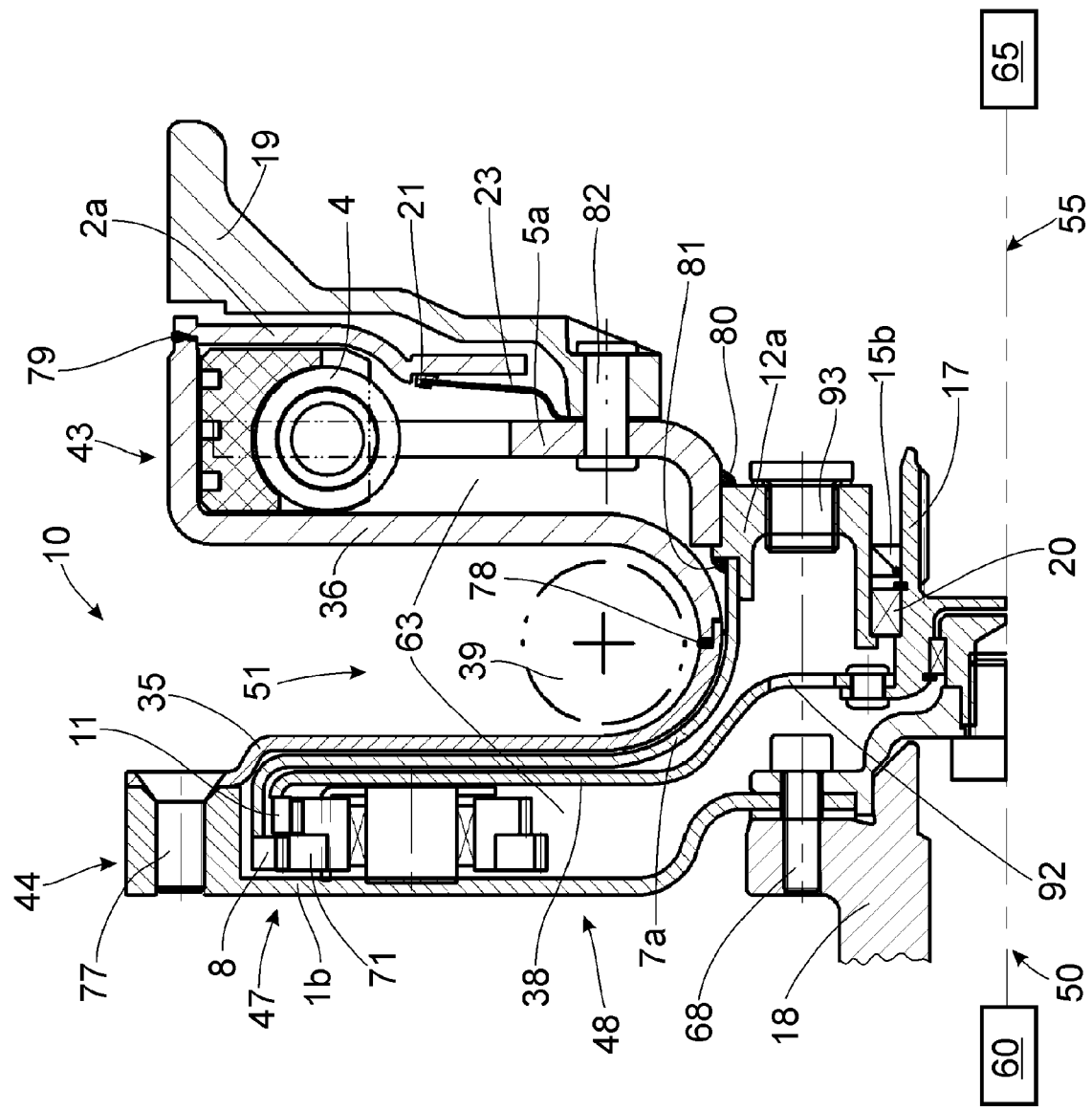

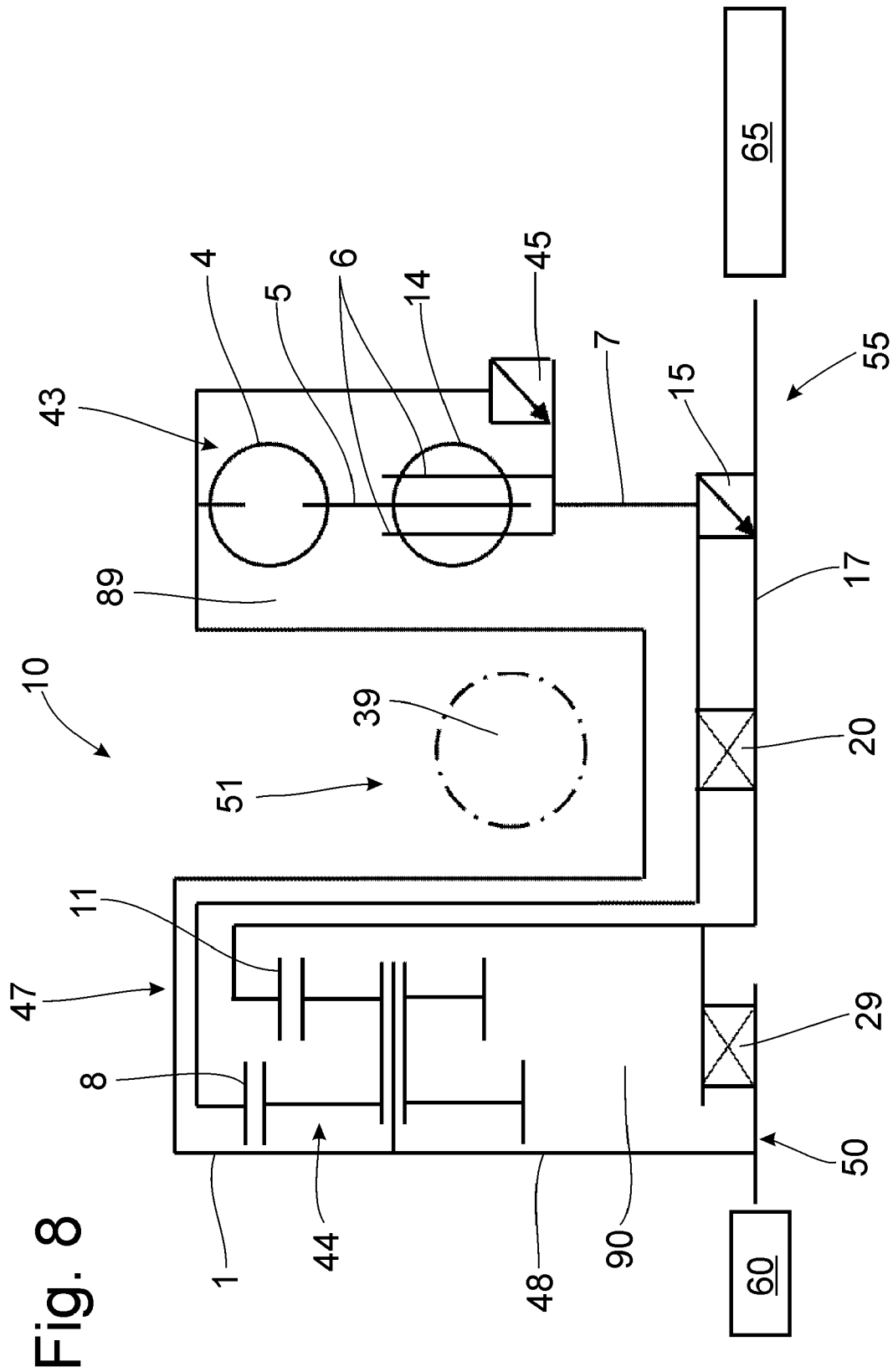

ROTATIONAL VIBRATION DAMPING ARRANGEMENT FOR THE DRIVE TRAIN OF A VEHICLE

PRIORITY CLAIM

This is a U.S. national stage of application No. PCT/EP2013/062554, filed on Jun. 18, 2013. Priority is claimed on the following application: Country: Germany, Application No.: 10 2012 212 593.0, Filed: Jul. 18, 2012; the content of which is incorporated herein by reference in its entirety.

FIELD OF THE INVENTION

The present invention is directed to a torsional vibration damping arrangement for the drivetrain of a vehicle, comprising an input region to be driven in rotation around an axis of rotation and an output region, wherein there are provided between the input region and the output region a first torque transmission path and parallel thereto a second torque transmission path and a coupling arrangement for superposing the torques guided via the torque transmission paths, wherein a phase shifter arrangement is provided in the first torque transmission path for generating a phase shift of rotational irregularities guided via the first torque transmission path relative to rotational irregularities guided via the second torque transmission path.

BACKGROUND OF THE INVENTION

A generic torsional vibration damping arrangement known from German Patent Application DE 10 2011 007 118 A1 divides the torque introduced into an input region, for example through a crankshaft of a drive unit, into a torque component transmitted via a first torque transmission path and a torque component guided via a second torque transmission path. Not only is there a static torque divided in this torque division, but also the vibrations and rotational irregularities which are generated, for example, by the periodically occurring ignitions in a drive unit and which are contained in the torque to be transmitted are also divided proportionately into the two torque transmission paths. The torque components transmitted via the two torque transmission paths are brought together again in a coupling arrangement and are then introduced as a total torque into the output region, for example, a friction clutch or the like. The entire disclosure of DE 2011 007 118 A1 is incorporated herein by reference.

A phase shifter arrangement is provided in at least one of the torque transmission paths. This phase shifter arrangement operates like a vibration damper, i.e., it is formed with a primary side and a secondary side which is rotatable with respect to the primary side through the compressibility of a spring arrangement. In particular when this vibration system passes into a supercritical state, i.e., when it is excited with vibrations exceeding the resonant frequency of the vibration system, a phase shift of up to 180° occurs. This means that at maximum phase displacement the vibration components proceeding from the vibration system are shifted in phase by 180° with respect to the vibration components received by the vibration system. Since the vibration components guided via the other torque transmission path do not undergo a phase shift or, if so, a different phase shift, the vibration components which are contained in the unified torque components and which are then shifted in phase with respect to one another are destructively superposed on one another such that, ideally, the total torque introduced into the output region is a static torque which contains essentially no vibration components.

SUMMARY OF THE INVENTION

It is an object of the present invention to further develop a torsional vibration damping arrangement, preferably in vehicles with longitudinally arranged drive units and driveshaft extending transversely thereto, such that this torsional vibration damping arrangement forms an axial passage space for the driveshaft between the phase shifter arrangement and the coupling arrangement.

According to the invention, this object is met through a torsional vibration damping arrangement for the drivetrain of a vehicle, comprising an input region to be driven in rotation around an axis of rotation and an output region, wherein there are provided between the input region and the output region a first torque transmission path and parallel thereto a second torque transmission path and a coupling arrangement communicating with the output region for superposing the torques guided via the torque transmission paths, and wherein a phase shifter arrangement is provided in the first torque transmission path for generating a phase shift of rotational irregularities guided via the first torque transmission path relative to rotational irregularities guided via the second torque transmission path.

At least a portion of the phase shifter arrangement and the coupling arrangement are spaced apart from one another axially at least on part of the radial extension thereof and accordingly form a passage space for arranging a driveshaft of the vehicle extending transverse to the axis of rotation A, and the passage space is formed radially outside of a connection region of the phase shifter arrangement and coupling arrangement.

This passage space divides the compactly installed unit of phase shifter arrangement and coupling arrangement which is known, e.g., from German Patent Application DE 10 2011 007 118 A1 into two separate installation spaces within the torsional vibration damping arrangement, wherein the phase shifter arrangement and the coupling arrangement are connected to one another in a torque-guiding manner. This connection between phase shifter arrangement and coupling arrangement can be direct or can be formed by a connection region, e.g., by a connection flange.

This embodiment of the axial spacing of the phase shifter arrangement from the coupling arrangement is particularly advantageous in installation space concepts in motor vehicles with longitudinally installed front-mounted engines and front wheel drive for implementing a transversely extending driveshaft.

A primary mass of the torsional vibration damping arrangement can be connected in this case, e.g., to the crankshaft so as to be fixed with respect to rotation relative to it and likewise connected to a control plate so as to be fixed with respect to rotation relative to it. A planet carrier of the coupling arrangement is connected to, and centered with respect to, a connection flange so as to be fixed with respect to rotation relative to it, advantageously via a Hirth coupling, this connection flange likewise being connected to the crankshaft so as to be fixed with respect to rotation relative to it. The connection of the Hirth coupling can be realized via a center disk as well as by a plurality of screws arranged at the circumference. Together with planet gears, these components form a primary side of the power split. An outer spring set of the phase shifter arrangement is actuated by the primary mass via at least one sliding block and is connected by a hub disk to an inner spring set located radially inside of the outer spring set. A rotationally locked connection of an intermediate flange to the inner spring set is realized radially inside of the inner spring set by at least one cover plate. This cover plate is in turn connected to a driving ring gear carrier so as to be fixed with respect to rotation relative to it. If only the outer spring set of the phase shifter arrangement is provided, the hub disk transmits the torque directly to the driving ring gear carrier. A driving ring gear is in rotationally locked relationship with the driving ring gear carrier. In addition, an additional mass can be arranged in a rotationally locked manner at the driving ring gear carrier in order to increase the mass moment of inertia. The stepped or non-stepped planet gears are rotatably supported on a planet gear carrier which is connected to the connection flange so as to be fixed with respect to rotation relative to it. These planet gears mesh with the driving ring gear and the driven ring gear. A driven mass is positioned at the driven ring gear so as to be fixed with respect to rotation relative to it. A rotationally locked connection to the transmission input shaft can be produced at the driven mass, for example via a spline connection; a friction clutch, a converter or the like unit can be positioned thereon.

An inner region of the torsional vibration damping arrangement which can also be referred to as a common wet space for phase shifter arrangement and coupling arrangement is divided into a phase shifter wet space and a coupling arrangement wet space by a common sealing element which is positioned radially between the planet gear carrier and the driving ring gear carrier adjacent to a bearing which rotatably supports the planet gear carrier relative to the driving ring gear carrier, and on the start-up element side. In this respect, the wet space is sealed in the region of the phase shifter arrangement relative to a dry space forming the surrounding space of the torsional vibration damping arrangement by a sealing element which is positioned at the axial height of the driveshaft radially between the intermediate flange and the radially inwardly extending continuation of the control plate. In the region of the coupling arrangement, the wet space is sealed relative to the dry space by a seal which is preferably formed as a bellows seal and which is positioned between the additional mass and the driven mass.

The two wet spaces, in this case the phase shifter wet space and the coupling arrangement wet space, are preferably filled with a lubricant such as oils or greases for reducing friction.

For purposes of facilitating assembly of the center screw of the Hirth coupling, it is advantageous to provide a through opening radially medially at the driven mass, which through opening can be closed by a closure screw with a sealing ring in order to prevent escape of lubricant from the wet space. The rotationally locked connection of the intermediate flange to the driving ring gear carrier is advantageously effected by a screw connection which can be configured so as to facilitate assembly by means of a mounting opening at the planet gear carrier and a mounting opening at the driven mass. The mounting opening in the driven mass can be closed by a closure screw and an associated sealing ring to prevent escape of lubricants from the coupling wet space. The mounting opening in the planet carrier is advantageously formed as an elongated hole to compensate for various twisting angles between the planet gear carrier, driven mass and driving ring gear carrier.

The driving ring gear carrier is supported relative to the planet gear carrier by a bearing which is itself connected to and centered with respect to the connection flange so as to be fixed with respect to rotation relative to it, advantageously by means of the Hirth coupling. The driven mass is likewise supported relative to the planet gear carrier via a bearing.

In an advantageous embodiment, the coupling arrangement comprises a first input portion and a second input portion into which torques guided via the first torque transmission path and second torque transmission path are introduced, and coupling arrangement or a superposition unit in which the introduced torques are combined again, and an output portion which conveys the combined torque, for example, to a friction clutch. The first input portion is connected in operative direction thereof to the phase shifter arrangement on one side and to the superposition unit on the other side. The second input portion is connected in operative direction thereof to the input region on one side and to the superposition unit on the other side. The superposition unit is in turn connected in operative direction thereof to both the first input portion and second input portion on one side and to the output portion on the other side. The output portion forms the output region and, in an advantageous embodiment, can receive a friction clutch.

To achieve the phase shift in a simple manner in one of the torque transmission paths, the phase shifter arrangement comprises a vibration system with a primary mass and a secondary mass which is rotatable with respect to the primary mass around the axis of rotation A against the action of a spring arrangement. A vibration system of this type can be constructed as a kind of vibration damper, known per se, in which the resonant frequency of the vibration system can be adjusted in a defined manner, particularly by influencing the primary-side mass and secondary-side mass as well as the stiffness of the spring arrangement, and the frequency at which there is a transition to the supercritical state can accordingly also be determined.

In a further advantageous embodiment of the torsional vibration damping arrangement, with respect to a torque running in axial direction from the input region to the output region, the coupling arrangement can be arranged downstream of the phase shifter arrangement in this axial direction. The passage space for the driveshaft of the motor vehicle can be provided by means of the axial spacing of the phase shifter arrangement relative to the coupling arrangement. A stiff connection of the phase shifter arrangement and, therefore, a favorable adjustability of the spring arrangement in the phase shifter arrangement can be achieved by the direct rotationally locked connection of the primary mass of the phase shifter arrangement to the input region which can be formed, for example, by a crankshaft. The course of the first torque transmission path is considered advantageous in this arrangement because it extends from the input region via the phase shifter, and further via an intermediate element into the coupling arrangement and, from the latter, into the output region.

In an embodiment of the torsional vibration damping arrangement which is an alternative to that described above and which is likewise advantageous, the phase shifter arrangement, with respect to a torque running in axial direction from the input region to the output region, can be arranged downstream of the coupling arrangement in this axial direction. This arrangement makes possible a direct and therefore stiff connection of the coupling arrangement to the input region. However, the torque component which runs through the phase shifter arrangement must first be guided past the upstream coupling arrangement. Accordingly, the connection of the phase shifter arrangement to the input region is less stiff. This can be advantageous depending on the layout of the vibration system.

In a further advantageous embodiment, the phase shifter arrangement is connected to the input region in a wobble-absorbing manner and so as to be fixed with respect to rotation relative to it. This can be carried out in that the primary mass of the phase shifter arrangement is connected to the input region, which is formed by the crankshaft in the following embodiment examples, so as to be fixed with respect to rotation relative to it by means of a connection element, advantageously by means of a screw connection, which connection element is in turn connected to at least one tangential leaf spring so as to be fixed with respect to rotation relative to it, which tangential leaf spring is connected to a connection plate so as to be fixed with respect to rotation relative to it, which connection plate is fastened to the crankshaft, e.g., by a screw connection, so as to be fixed with respect to rotation relative to it. The rotationally locked fastening of the connection element to the tangential leaf spring and of the tangential leaf spring to the connection plate can advantageously be carried out by a rivet connection, but also by a screw connection. Axial offsets of the torsional vibration damping arrangement with respect to the crankshaft around the axis of rotation A can be compensated by the wobble-absorbing connection of the primary mass to the crankshaft.

In a further advantageous embodiment, the torsional vibration damping arrangement can have a pendulum mass. The pendulum mass can be positioned spatially in the region of the phase shifter arrangement and/or in the connection region between the phase shifter arrangement and the coupling arrangement and outside of the phase shifter arrangement and coupling arrangement and/or in the region of the coupling arrangement. The various possibilities for positioning the pendulum mass make it possible to adapt to the available installation space. When the pendulum mass is positioned on the radially outer side, the dimensioning of the pendulum mass can be smaller than if it were positioned farther radially inward. When the pendulum mass is used, it is negligible whether only one outer spring set is positioned in the phase shifter arrangement or one outer spring set and one inner spring set or an additional spring arrangement is positioned in the torque path between the phase shifter arrangement and the coupling arrangement. Decoupling of rotational irregularity is improved when using the pendulum mass.

In a further advantageous embodiment, it is provided that the inner region of the torsional vibration damping arrangement, formed in this case by the phase shifter arrangement and the coupling arrangement, forms the common wet space as has already been described. The common wet space is preferably filled with lubricant such as oil or grease to reduce friction. Since this is a common wet space, it is preferable that only one type of lubricant is introduced into the wet space. This is advantageous with respect to the production of the torsional vibration damping arrangement.

In a further advantageous embodiment, the phase shifter arrangement and the coupling arrangement form a phase shifter wet space and a coupling arrangement wet space as has already been described. By forming two wet spaces, in this case the phase shifter wet space and the coupling arrangement wet space, filling with lubricants can be carried out differently. This is particularly preferable when the phase shifter arrangement and the coupling arrangement require different lubricants by reason of their constructional configuration. This may be necessary, for example, when the coupling arrangement is constructed as a transmission gear set which requires a light grease and the phase shifter arrangement is constructed, e.g., with a spring element and a sliding block which are preferably operated with heavier grease. In this respect, the connections of the component parts cooperating to form the wet space of the phase shifter arrangement and coupling arrangement, e.g., the connection of the primary mass to the control plate, are to be constructed in such a way that lubricant cannot escape.

In an embodiment of the torsional vibration damping arrangement which is an alternative to that described above and which is likewise advantageous, the phase shifter wet space and the coupling arrangement wet space can be sealed relative to one another by a common sealing element as was already described. For example, the sealing element can prevent lubricant located in the phase shifter wet space from reaching the coupling wet space. This is particularly advantageous when the phase shifter arrangement must be filled with a viscous grease by reason of its constructional layout but the coupling arrangement is filled with a light oil and the two lubricants may not mix with one another.

BRIEF DESCRIPTION OF THE DRAWINGS

Preferred embodiments of the invention will be described in the following with reference to the accompanying drawings in which:

FIG. 7 shows a torsional vibration damping arrangement with a phase shifter arrangement on a start-up element side and a coupling arrangement on a drive unit side; and FIG. 8 shows a torsional vibration damping arrangement as in FIG. 7 but as schematic diagram.

DETAILED DESCRIPTION OF THE PRESENTLY PREFERRED EMBODIMENTS

Figure 1:
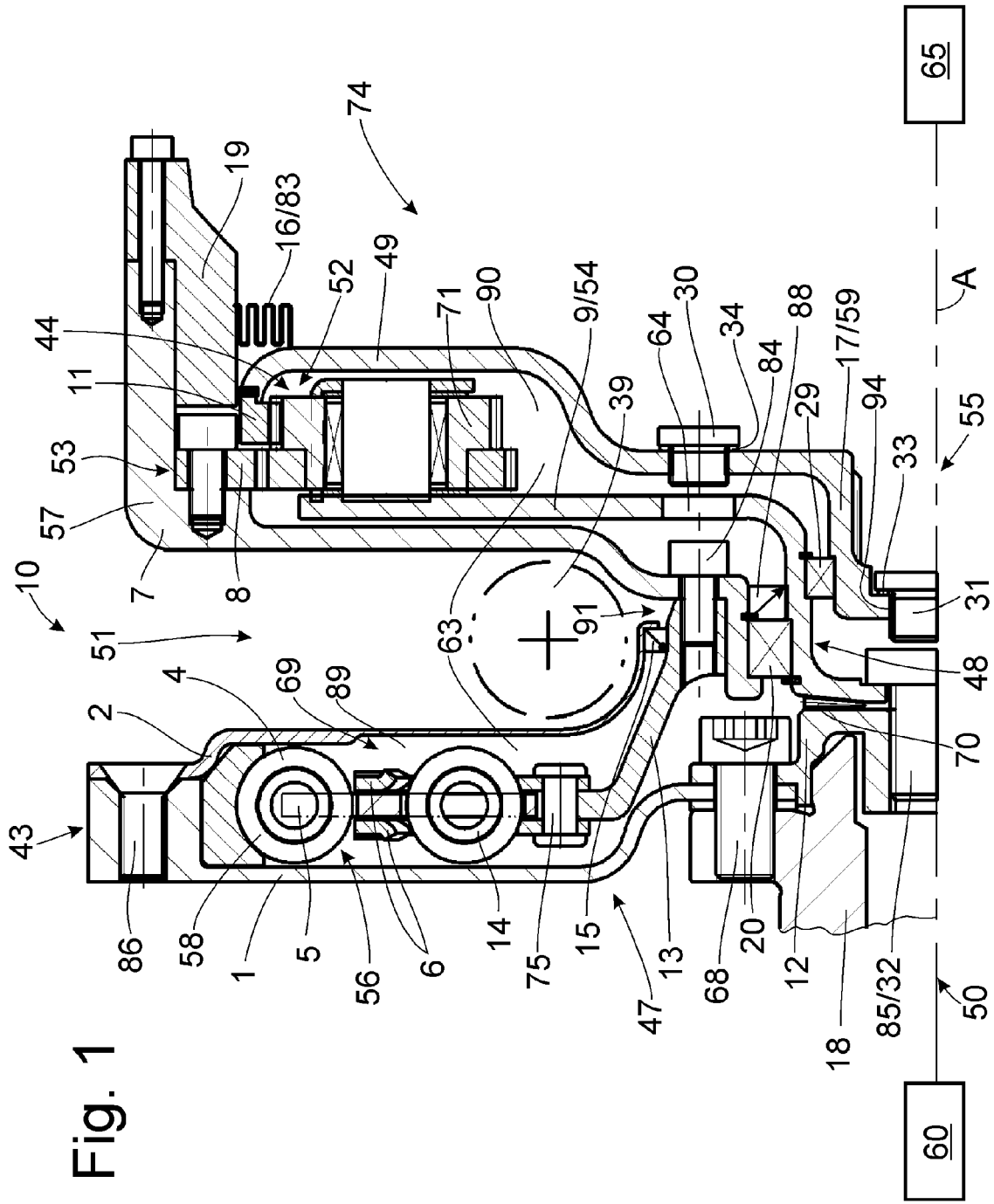
FIG. 1 shows a torsional vibration damping arrangement in which a phase shifter arrangement positioned on a drive unit side is spaced apart axially from a coupling arrangement positioned on a start-up element side.

FIG. 1 shows a torsional vibration damping arrangement 10 which operates on the principle of power splitting or torque splitting. The torsional vibration damping arrangement 10 can be arranged in a drivetrain of a vehicle between a drive unit and the subsequent portion of the drivetrain, i.e., for example, a start-up element 65 such as a friction clutch, a hydrodynamic torque converter or the like.

The torsional vibration damping arrangement 10 comprises an input region, designated generally by 50. This input region 50 can be connected, for example by a screw connection 68, to a crankshaft 18 of a drive unit 60 which is formed as an internal combustion engine. In the input region 50, the torque received from the drive unit 60 branches into a first torque transmission path 47 and a second torque transmission path 48. In the region of a coupling arrangement, designated generally by reference numeral 44, the torque components guided via the two torque transmission paths 47, 48 are introduced into the coupling arrangement 44 by means of a first input portion 53 and a second input portion 54 and are combined again and then conveyed to an output region 55.

A vibration system, designated generally by reference numeral 56, is integrated in the first torque transmission path 47. The vibration system 56 acts as a phase shifter arrangement 43 and comprises a primary mass 1, which is to be connected, for example, to the drive unit 60, and an intermediate element 57 which is formed in this instance as an intermediate mass and which conveys the torque. The primary mass 1 and a control plate 2 which are connected to one another so as to be fixed with respect to rotation, preferably by means of a screw connection 86, substantially completely surround radially outwardly a spatial region 69 in which there is received with respect to the radial arrangement an outer spring set 4 and an inner spring set 14 for the vibration system 56. The outer spring set 4 comprises a plurality of spring units 58 which are arranged successively in circumferential direction and also possibly so as to be nested one inside the other. Each spring unit 58 preferably comprises at least one compression coil spring. The inner spring set 14 likewise generally comprises a plurality of spring units which are arranged successively in circumferential direction and which preferably include at least one coil spring. The spring unit 58 of the outer spring set 4 is supported at the primary mass 1 on the one hand and at a hub disk 5 formed as center disk on the other hand. The inner spring set 14 is supported at the hub disk 5 on the one hand and at at least one cover plate 6 on the other hand. The cover plate is connected, preferably by a rivet connection 75, to an intermediate flange 13 so as to be fixed with respect to rotation relative to it. The intermediate flange 13 is in turn connected to the intermediate element 57 so as to be fixed with respect to rotation relative to it, preferably by a screw connection 84, this intermediate element 57 forming the first input portion 53 of the coupling arrangement. The intermediate element 57 guides the first torque as first torque transmission path 47 into the coupling arrangement 44 via the driving ring gear 8 which is connected to the driving ring gear carrier 7 so as to be fixed with respect to rotation relative to it.

In a further embodiment, not shown, the inner spring set 14 may be omitted. If this is the case, the hub disk 5 is connected to the intermediate element 57 so as to be fixed with respect to rotation relative to it, and the torque is guided from the outer spring set 4 via the hub disk 5 directly to the intermediate element 57 and from the latter via the driving ring gear 8 into the coupling arrangement 44.

In the second torque transmission path 48, proceeding from the drive unit 60, the torque is guided via the crankshaft 18 into the second input portion 54. This second input portion 54 is connected to the crankshaft 18 so as to be fixed with respect to rotation relative to it, preferably by means of a screw connection 85 which is formed in this case as a center screw 32 with a Hirth coupling 70 and forms the planet gear carrier 9 of the coupling arrangement 44. The planet gears 71 of the coupling arrangement 44 which are rotatably positioned at the planet gear carrier 9 combine the first torque transmission path 47, which is guided into the coupling arrangement 44 via the driving ring gear 8, with the second torque transmission path 48, which is guided via the second input portion 54 formed by the planet gear carrier 9, to form one torque. The combined torque is conveyed via the driven ring gear 11, which is connected to the secondary mass 59 so as to be fixed with respect to rotation relative to it, to the secondary mass 59 which forms the output portion 49 and is guided from the latter, for example, to a friction clutch which is not shown.

A seal 83 which is formed in this case as a bellows seal 16 is arranged between an additional mass 19 and a driven mass 17 and allows a low-friction torque sealing. If no additional mass 19 is provided, the seal 83 can also be positioned between the driving ring gear carrier 7 and the driven mass 17. Together with a sealing element 15 positioned radially between the control plate 2 and intermediate flange 13, the sealing element 15 and bellows seal 16 seal a wet space from a dry space 74 forming the surrounding space of the torsional vibration damping arrangement 10, this wet space forms the inner region of the torsional vibration damping arrangement 10 and can preferably be filled with grease or the like friction-minimizing means such as oil. In so doing, the sealing element 88, which is positioned radially between the planet gear carrier 9 and the driving ring gear carrier 7 and axially adjacent to a bearing 20 which rotatably supports the planet gear carrier 9 with respect to the driving ring gear carrier 7, divides the torsional vibration damping arrangement 10 into a phase shifter wet space 89 and a coupling arrangement wet space 90. As a result of this division into two wet spaces, the respective wet spaces can be filled with lubricant in a specific manner. The phase shifter wet space 89 is preferably filled with grease and the coupling arrangement wet space 90 is preferably filled with oil.

In an embodiment, not shown, the sealing element 88 can be omitted. If this is the case, the phase shifter wet space 89 and coupling arrangement wet space 90 are connected to one another. In this case, these two wet spaces can be filled with a lubricant such as oil or grease which is effective for both wet spaces. This embodiment facilitates filling during production.

In contrast to the known embodiments of torsional vibration damping arrangements such as that also disclosed in DE 10 2011 007 118 A1 in which the phase shifter arrangement and the coupling arrangement form a compact installation space which is minimized in axial dimension, the configuration of the axial arrangement of the phase shifter arrangement 43 and coupling arrangement 44 shown here is spaced apart such that a passage space 51 for arranging a driveshaft 39 of a vehicle extending transverse to the axis of rotation (A) is formed by this spacing apart of the phase shifter arrangement 43 and the coupling arrangement 44. As is shown, the phase shifter arrangement 43 can be spaced apart in its entirety from the coupling arrangement 44. In an embodiment to be shown later, the phase shifter arrangement 43 can also be spaced apart only partially from the coupling arrangement 44.

The driveshaft 39 extends transverse to the axis of rotation (A). The driveshaft 39 can form a different angle to the axis of rotation (A). A parallel arrangement of the driveshaft 39 to the axis of rotation (A) is accordingly ruled out.

Figure 2:
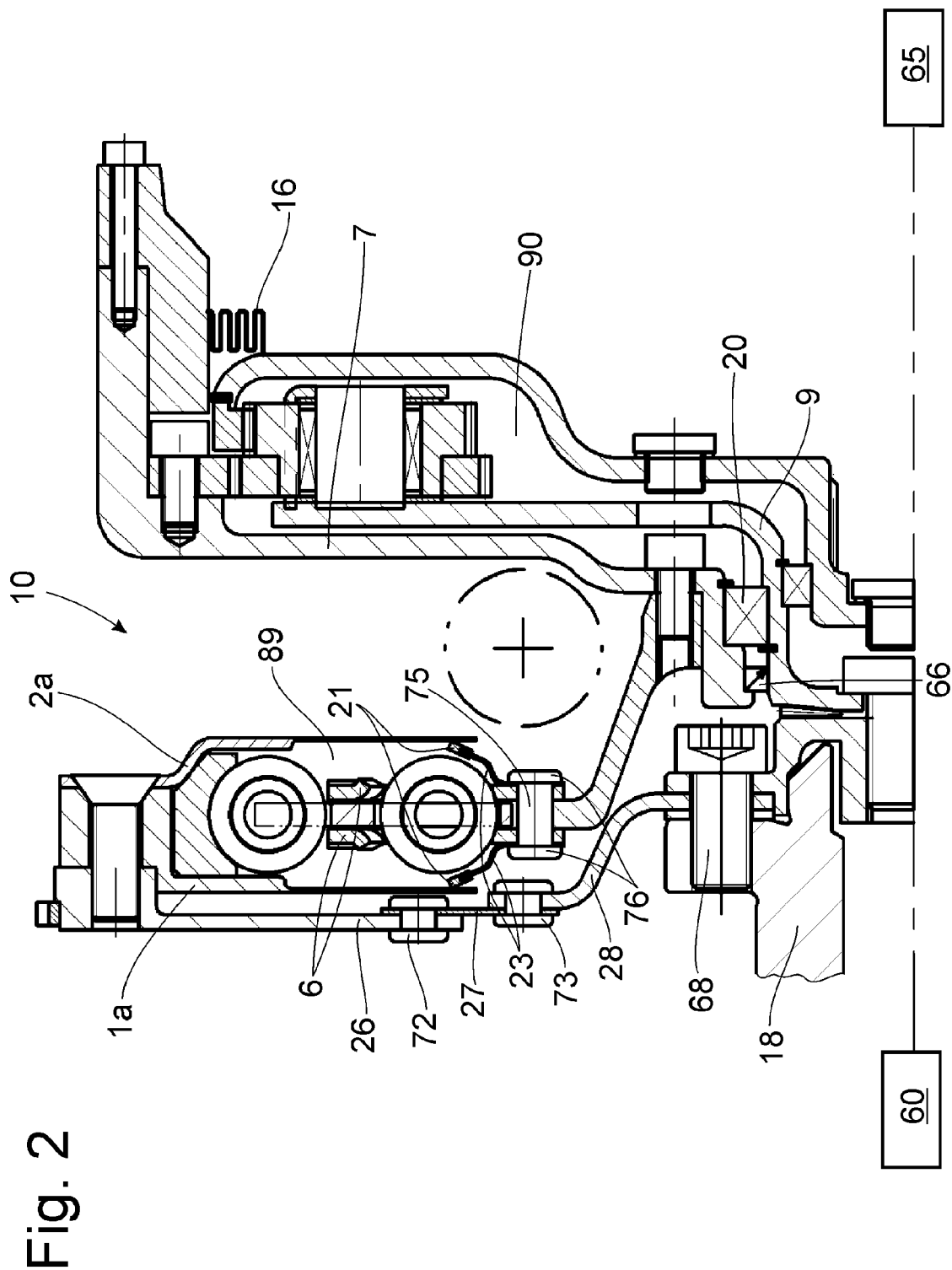
FIG. 2 shows a torsional vibration damping arrangement as in FIG. 1 but with a wobble-absorbing connection of a primary mass to an input region and with a sealing of a wet space and a dry space in the region of an inner spring set.

FIG. 2 shows a torsional vibration damping arrangement 10 as in FIG. 1 but with a wobble-absorbing connection of the primary mass 1a to the crankshaft 18 and a sealing of the phase shifter wet space 89 by means of two sealing lips 21.

The wobble-absorbing connection is achieved in that the primary mass 1a is connected to the connection element 26 so as to be fixed with respect to rotation relative to it. This connection element 26 is connected to at least one tangential leaf spring 27, preferably by a rivet connection 72. The tangential leaf spring 27 is radially inwardly connected to at least one angled connection plate 28 so as to be fixed with respect to rotation relative to it, preferably by a rivet connection 73. The connection plate 28 is preferably positioned at the crankshaft 18 so as to be fixed with respect to rotation relative to it by the screwed connection 68. This embodiment makes it possible to compensate for an offset of the axis of rotation of the torsional vibration damping arrangement 10 and a start-up element.

The phase shifter wet space 89 which is preferably formed by the primary mass 1 and the control plate 2 is sealed by two sealing lips 21 which are received at two sealing plates 23.

The two sealing plates 23 are connected on both sides of the intermediate flange 13 to the cover plates 6 so as to be fixed with respect to rotation relative to it, preferably by a rivet connection 75, such that the sealing plates 23 are located in each instance between the rivet head 76 and the cover plate 6. The sealing lips 21 contact the radially inwardly extending lengthening of the primary mass 1a and control plate 2a. The phase shifter wet space 89 is preferably filled with grease or a similar lubricant.

As is described in connection with FIG. 1, the coupling arrangement wet space 90 is sealed on one hand by bellows seal 16 and on the other hand by a sealing element 66 which is positioned radially between the planet carrier 9 and the driving ring gear carrier 7 axially adjacent to the bearing 20 on the screwed connection 68 side.

Figure 3:
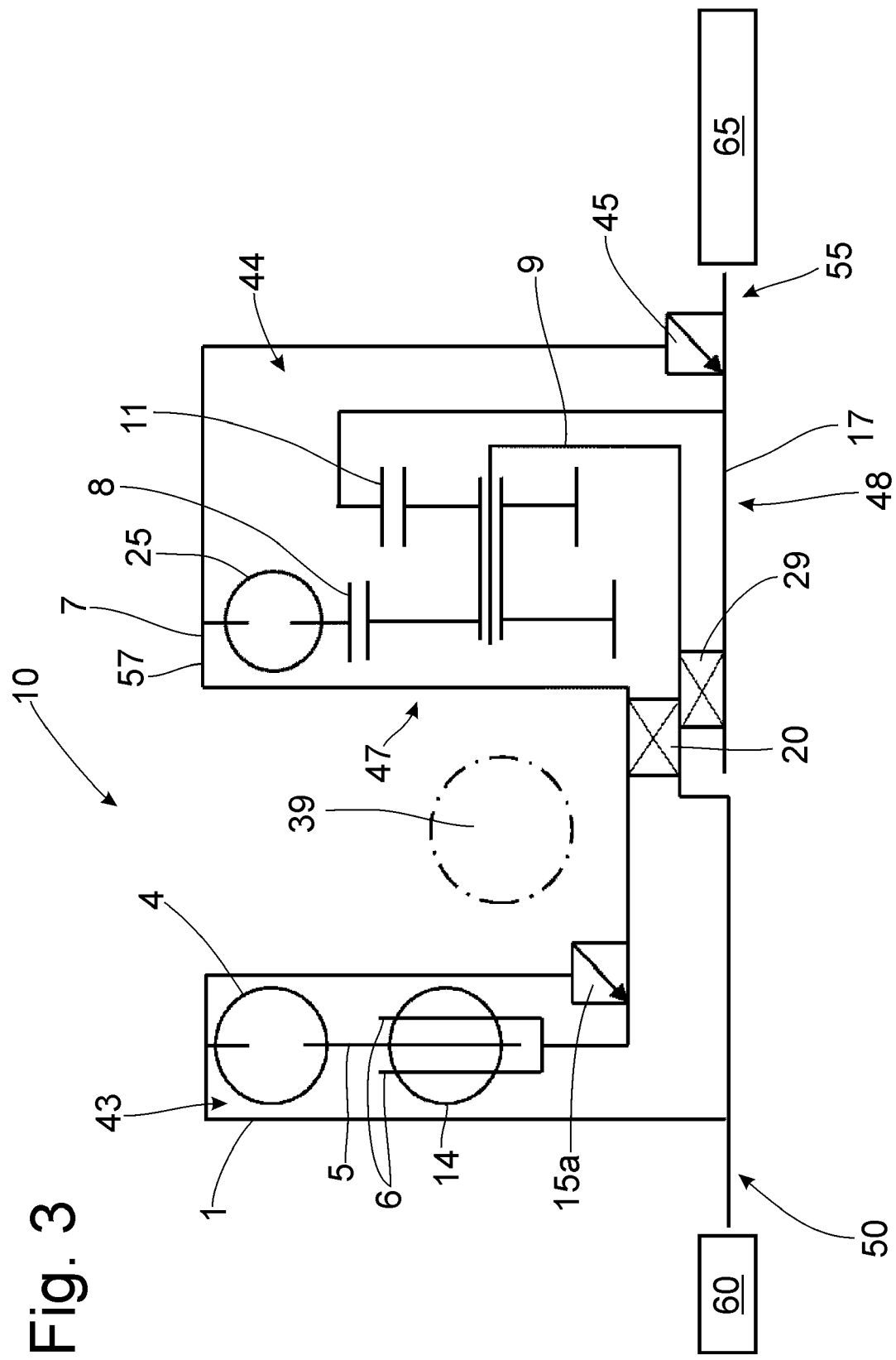
FIG. 3 shows a torsional vibration damping arrangement as in FIG. 1 but as a schematic diagram and with an additional spring arrangement between a driving ring gear carrier and a driving ring gear.

FIG. 3 shows a torsional vibration damping arrangement 10 as in FIG. 1 but as a schematic diagram and with the difference that the phase shifter arrangement 43 is only partially axially spaced apart from the coupling arrangement 44 to create space for a driveshaft 39. The phase shifter arrangement 43 is partially positioned on the side of the drive unit 60, whereas the coupling arrangement 44 is positioned on the side of the start-up element 65. An additional spring arrangement 25 is positioned in the region of the coupling arrangement 44. The additional spring arrangement 25 can preferably be positioned between the driving ring gear 8 and the inner spring set 14, the driving ring gear 8 being connected to the driving ring gear carrier 7 so as to be fixed with respect to rotation relative to it and in this instance forming the intermediate element 57. The additional spring arrangement 25 improves the decoupling of rotational irregularities and increases the storable rotational energy. Therefore, the additional spring arrangement is operatively associated with the phase shifter arrangement. As is shown here, however, the position may be outside of the phase shifter arrangement inside the coupling arrangement. In a variant which is not shown, it is also possible to position the additional spring arrangement 25 radially inside of the coupling arrangement 44. The sealing of the inner region of the torsional vibration damping arrangement is carried out by a sealing element 45 in the region of the coupling arrangement and by a sealing element 15a in the region of the phase shifter arrangement.

Figure 4:
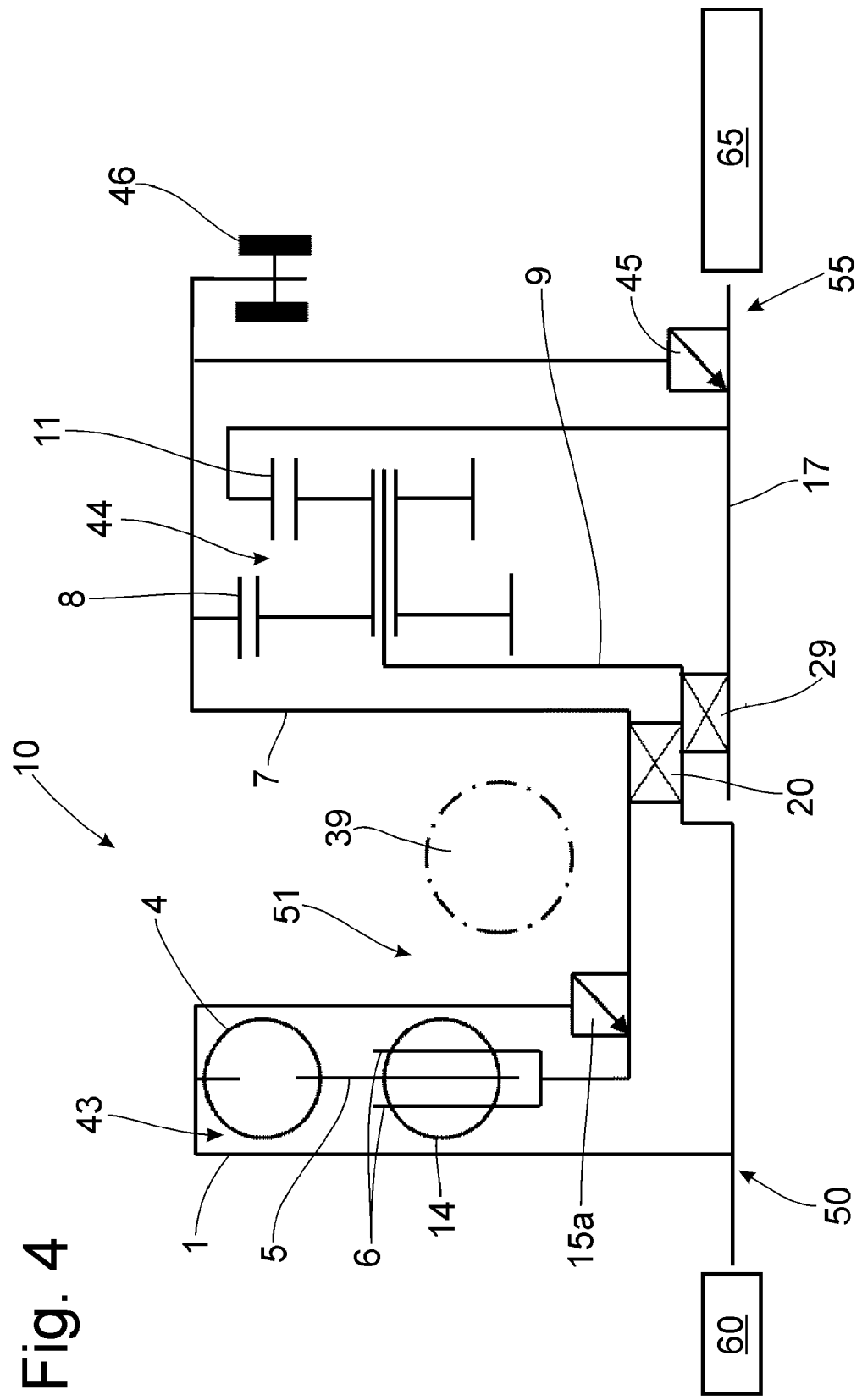
FIG. 4 shows a torsional vibration damping arrangement as in FIG. 1 but as a schematic diagram and with a pendulum mass at the driving ring gear carrier.

FIG. 4 shows a torsional vibration damping arrangement 10 as in FIG. 3 but without the additional spring arrangement 25 and with a pendulum mass 46 which is positioned at the driving ring gear carrier 7. The pendulum mass 46 can be variable-frequency or also fixed-frequency. The pendulum mass 46 improves the decoupling of rotational irregularities by exciting one or more higher engine orders so as to increase signal strength and promote extinction. In an embodiment that is not shown, the pendulum mass 46 can also be positioned inside the coupling arrangement 44.

Figure 5:
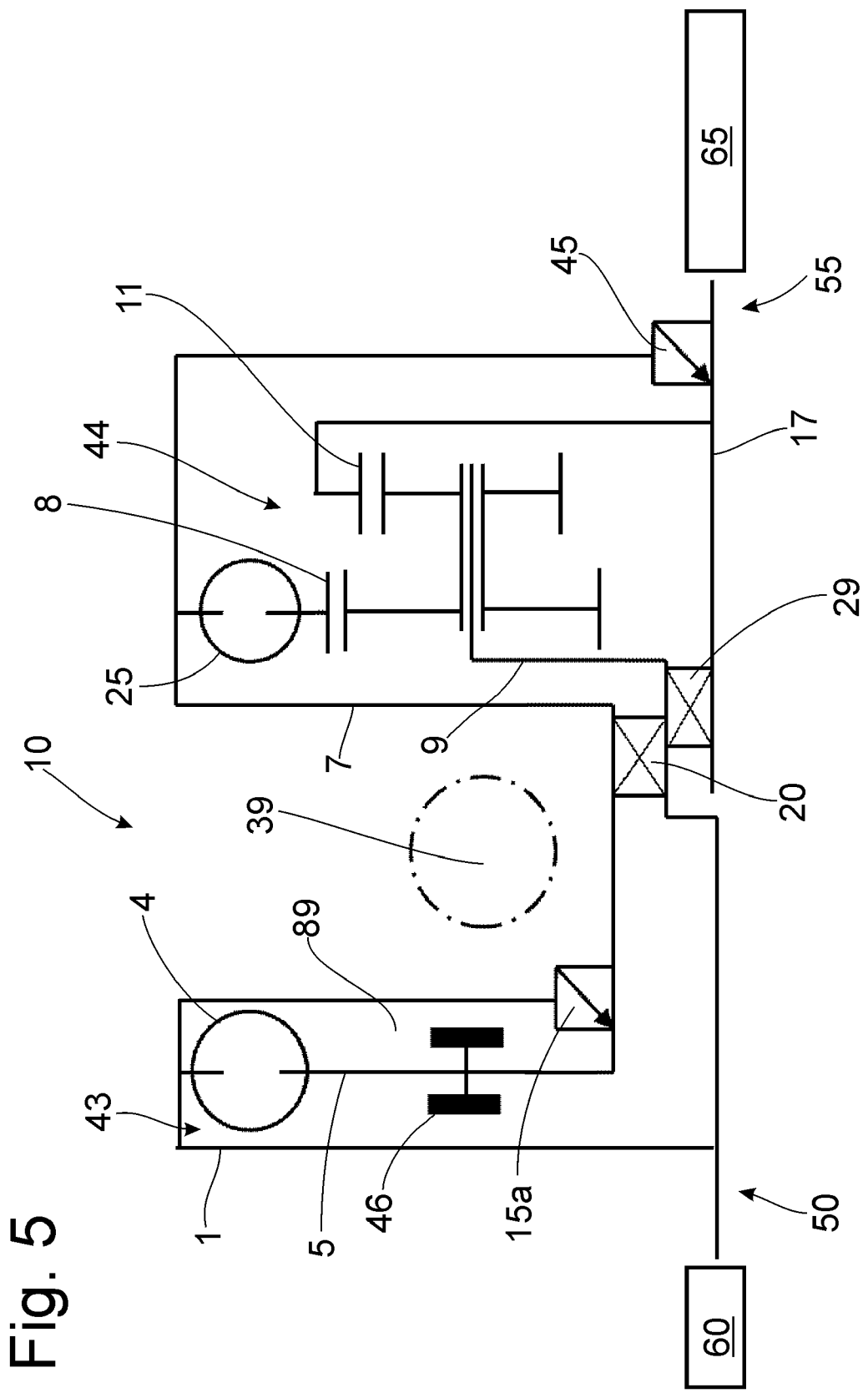
FIG. 5 shows a torsional vibration damping arrangement as in FIG. 4 but with a pendulum mass which is positioned downstream of the outer spring set coming from the drive unit in torque direction.

FIG. 5 shows a torsional vibration damping arrangement 10 as in FIG. 4 but without the inner spring set 14 and with a pendulum mass 46 which is positioned at the hub disk 5 between the outer spring set 4 and the additional spring arrangement 25 in the region of the phase shifter wet space 89. This pendulum mass 46 can also be a variable-frequency or fixed-frequency pendulum mass 46. The pendulum mass 46 improves the decoupling of rotational irregularities through excitation of one or more higher engine orders so as to increase signal strength and promote extinction.

Figure 6:
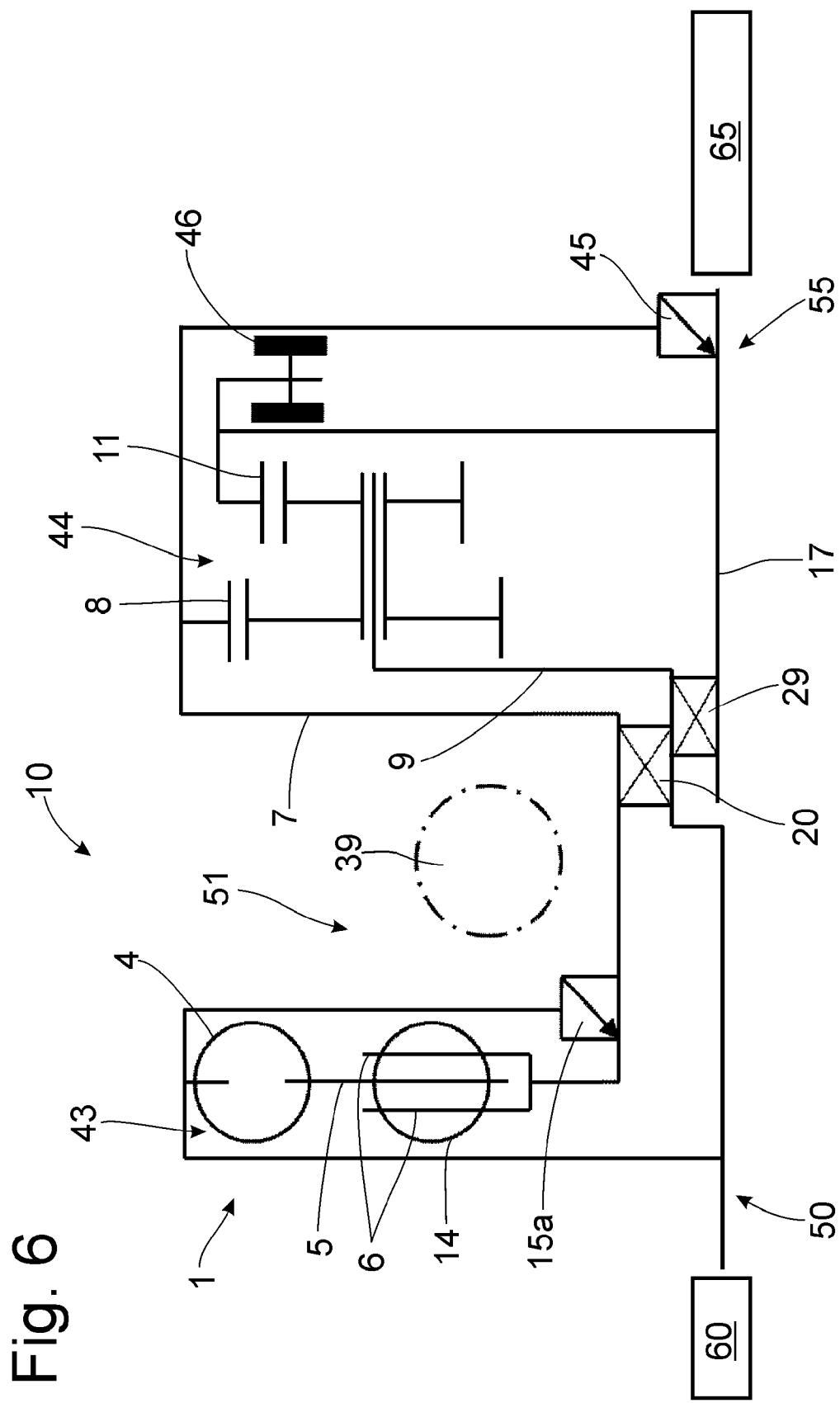
FIG. 6 shows a torsional vibration damping arrangement as in FIG. 4 but with a pendulum mass which is positioned at a driven mass.

FIG. 6 shows a torsional vibration damping arrangement 10 as in FIG. 4 but with a pendulum mass 46 positioned at the driven mass 17, for example in the radial region of the driven ring gear 11. The decoupling of the rotational irregularity at the output can be improved at rotational speeds greater than or equal to 1200 RPM to maximum rotational speed by this pendulum mass 46.

FIG. 7 shows a torsional vibration damping arrangement 10 which functions in the same manner as that shown in FIG. 1 but in which the coupling arrangement 44 is located on the drive unit 60 side and the phase shifter arrangement 43 which is spaced apart from the coupling arrangement 44 is located on the start-up element 65 side.

A passage space 51 for at least one driveshaft of a vehicle is formed through the spacing apart of the phase shifter arrangement 43 and coupling arrangement 44 in this embodiment also.

The first torque transmission path 47 runs via the primary mass 1b which is connected to the input region 50 so as to be fixed with respect to rotation relative to it, preferably by screwed connection 68, the input region 50 being formed in this instance by the crankshaft 18 of drive unit 60. The first torque is guided from the primary mass 1b into a first connection plate 35 which is connected to the primary mass 1b so as to be fixed with respect to rotation relative to it, preferably by a screwed connection 77. A second connection plate 36 which is connected to the first connection plate 35 so as to be fixed with respect to rotation relative to it, preferably by a weld connection 78, conveys the first torque from the first connection plate 35. In an embodiment which is not shown, the first connection plate 35 and the second connection plate 36 can be produced economically as a one-piece embodiment in the form of a one-piece connection plate, preferably as a shaped sheet metal part. The first connection plate 35 and the second connection plate 36 or, in case of a one-piece embodiment, the one-piece connection plate, are configured such that they surround a spatial area of the coupling arrangement 44 and phase shifter arrangement 43 such that a passage space 51 is formed for at least one driveshaft 39 of a vehicle.

The second connection plate 36 which is connected to the control plate 2a so as to be fixed with respect to rotation relative to it, preferably by a weld connection 79, guides the first torque on one side in operative direction of the outer spring set 4 into the outer spring set 4 of the phase shifter arrangement 43. The first torque is guided from the outer spring set 4 into a hub disk 5a which is connected to a connection flange 12a so as to be fixed with respect to rotation relative to it, preferably by a weld connection 80. The first torque is guided from the connection flange 12a to a driving ring gear carrier 7a which is connected to the connection flange 12a so as to be fixed with respect to rotation relative to it, by means of a weld connection 81 in a preferred embodiment. The driving ring gear carrier 7a conveys the first torque to the coupling arrangement 44 via the driving ring gear 8 which is connected to the driving ring gear carrier 7a so as to be fixed with respect to rotation relative to it.

The second torque transmission path 48 guides the second torque from the crankshaft 18 into the primary mass 1b. The planet gears 71 of the coupling arrangement 44 are rotatably supported at the primary mass 1b. The second torque travels from the primary mass 1b to the planet gears 71, where it is destructively recombined with the first torque which is guided via the driving ring gear 8 into the planet gears 71 and accordingly into the coupling gear unit 44. The combined torque is conveyed to the driven mass 17 via the driven ring gear 11 which is connected to the output plate 38 so as to be fixed with respect to rotation relative to, this driven mass 17 being connected to the output plate 38 so as to be fixed with respect to rotation relative to it, preferably by a rivet connection 87. The combined torque can be conveyed from the latter to the start-up element 65, for example, a friction clutch.

The sealing of the wet space 63 of the torsional vibration damping arrangement 10 is carried out by the sealing element 15b which is positioned radially inwardly between the driven mass 17 and the connection flange 12a and by a sealing lip 21 which is held by at least one sealing plate 23 and connected to the hub disk 5 so as to be fixed with respect to rotation relative to it, preferably by the rivet connection 82, and which seals relative to the control plate 2a with the sealing lip. A through opening 92 and 93 through which the screw 68 can be inserted can be arranged respectively at the output plate 38 and at the connection flange 12a in the radial region of the screwed connection 68 to facilitate assembly of the screwed connection 68 at the crankshaft 18. The through opening 93 at connection flange 12a can advantageously be closed again by a closure screw 30 and a sealing ring 34 to prevent the escape of grease, oil or another lubricant from the wet space 63.

The advantage of positioning of the coupling arrangement 44 on the drive unit 60 side resides in the fact that the planet gears 71 can be connected to the crankshaft 18 in a very stiff manner. This results in a stiff path of the second torque.

Further, a large additional mass 19 with a large mass moment of inertia can be connected to the hub disk 5 so as to be fixed with respect to rotation relative to it, preferably by a rivet connection 82.

FIG. 8 shows a torsional vibration damping arrangement 10 as in FIG. 7 but as a schematic diagram. In an embodiment that is not shown, a pendulum mass as shown in FIGS. 4 and 5 can be positioned at the driving ring gear carrier 7 and/or at the hub disk 5 in this torsional vibration damping arrangement 10 also.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCE NUMERALS 1 primary mass
1a primary mass
1b primary mass
2 control plate
2a control plate
4 outer spring set
5 hub disk
5a hub disk
6 cover plate
7 driving ring gear carrier
7a driving ring gear carrier
8 driving ring gear
9 planet gear carrier
10 torsional vibration damping arrangement
11 driven ring gear
12 connection flange
12a connection flange
13 intermediate flange
14 inner spring set
15 sealing element
15a sealing element
15b sealing element
16 bellows seal
17 driven mass
18 crankshaft
19 additional mass
20 bearing
21 sealing lip
22 sealing plate
23 sealing plate
24 connection piece
25 additional spring arrangement
26 connection element
27 tangential leaf spring
28 connection plate
29 bearing
30 closure screw
31 closure screw
32 center screw
33 sealing ring
34 sealing ring
35 first connection plate
36 second connection plate
38 output plate
39 driveshaft
43 phase shifter arrangement
44 coupling arrangement
45 sealing element
46 pendulum mass
47 first torque transmission path
48 second torque transmission path
49 output portion
50 input region
51 passage space
52 superposition unit
53 first input portion
54 second input portion
55 output region
56 vibration system
57 intermediate element
58 spring unit
59 secondary mass
60 drive unit
63 wet space
64 assembly opening
65 start-up element
66 sealing element
68 screwed connection
69 spatial area
70 Hirth coupling
71 planet gears
72 rivet connection
73 rivet connection
74 dry space
75 rivet connection
76 rivet head
77 screwed connection
78 weld connection
79 weld connection
80 weld connection
81 weld connection
82 rivet connection
83 seal 84 screw connection
85 screw connection
86 screw connection
87 rivet connection
88 sealing element
89 phase shifter wet space
90 coupling wet space
91 connection region
92 through opening
93 through opening

The invention claimed is:

1. Torsional vibration damping arrangement (10) for the drivetrain of a vehicle, comprising:
   an input region (50) so configured as to be driven in rotation around an axis of rotation (A) and an output region (55);
   a first torque transmission path (47) and parallel thereto a second torque transmission path (48), both said first and second torque transmission paths proceeding from said input region (50);
   a coupling arrangement (44) for superposing the torques guided via said first and second torque transmission paths (47; 48), said coupling arrangement (44) communicating with said output region (55);
   a phase shifter arrangement (43) in said first torque transmission path (47) for generating a phase shift of rotational irregularities guided via said first torque transmission path (47) relative to rotational irregularities guided via said second torque transmission path (48); wherein at least a portion of said phase shifter arrangement (43) and said coupling arrangement (44) are spaced apart from one another axially at least on part of said radial extension thereof and form a passage space (51) for arranging a driveshaft of said vehicle extending transverse to the axis of rotation (A), and wherein said passage space (51) is formed radially outside of a connection region of said phase shifter arrangement (43) and said coupling arrangement (44).

2. The torsional vibration damping arrangement (10) according to claim 1, wherein said coupling arrangement (44) comprises a first input portion (53), a second input portion (54), a superposition unit (52) and an output portion (49), wherein said first input portion (53) is connected to said phase shifter arrangement (43) and to said superposition unit (52), and said second input portion (54) is connected to said input region (50) and to said superposition unit (52), and said superposition unit (52) is connected to both said first input portion (53) and second input portion (54) and to said output portion (49), and wherein said output portion (49) forms said output region (55).

3. The torsional vibration damping arrangement (10) according to claim 1, wherein said phase shifter arrangement (43) comprises a vibration system (56) having a primary mass (1) and an intermediate element (57) which is rotatable with respect to said primary mass (1) around the axis of rotation (A) against the action of a spring arrangement (4).

4. The torsional vibration damping arrangement (10) according to claim 1, wherein, with respect to a torque running in axial direction from said input region (50) to said output region (55), said coupling arrangement (44) is arranged spatially downstream of said phase shifter arrangement (43).

5. The torsional vibration damping arrangement (10) according to claim 1, wherein with respect to a torque running in axial direction from said input region (50) to said output region (55), said phase shifter arrangement (43) is arranged spatially downstream of the coupling arrangement (44).

6. The torsional vibration damping arrangement (10) according to claim 1, wherein said phase shifter arrangement (43) is connected to said input region (50) in a wobble-absorbing manner and fixed with respect to rotation relative to said input region.

7. The torsional vibration damping arrangement (10) according to claim 1, wherein said torsional vibration damping arrangement (10) includes a pendulum mass (46).

8. The torsional vibration damping arrangement (10) according to claim 1, wherein phase shifter arrangement (43) and said coupling arrangement (44) form a common wet space (63).

9. The torsional vibration damping arrangement (10) according to claim 1, wherein said phase shifter arrangement (43) and said coupling arrangement (44) form a phase shifter wet space (89) and a coupling arrangement wet space (90).

10. The torsional vibration damping arrangement (10) according to claim 9, wherein said phase shifter wet space (89) and said coupling arrangement wet space (90) are sealed relative to one another by a common sealing element (88).

11. The torsional vibration damping arrangement (10) according to claim 2, wherein said phase shifter arrangement (43) comprises a vibration system (56) having a primary mass (1) and an intermediate element (57) which is rotatable with respect to said primary mass (1) around the axis of rotation (A) against the action of a spring arrangement (4).

12. The torsional vibration damping arrangement (10) according to claim 2, wherein, with respect to a torque running in axial direction from said input region (50) to said output region (55), said coupling arrangement (44) is arranged spatially downstream of said phase shifter arrangement (43).

13. The torsional vibration damping arrangement (10) according to claim 3, wherein, with respect to a torque running in axial direction from said input region (50) to said output region (55), said coupling arrangement (44) is arranged spatially downstream of said phase shifter arrangement (43).

14. The torsional vibration damping arrangement (10) according to claim 2, wherein with respect to a torque running in axial direction from said input region (50) to said output region (55), said phase shifter arrangement (43) is arranged spatially downstream of the coupling arrangement (44).

15. The torsional vibration damping arrangement (10) according to claim 3, wherein with respect to a torque running in axial direction from said input region (50) to said output region (55), said phase shifter arrangement (43) is arranged spatially downstream of the coupling arrangement (44).

16. The torsional vibration damping arrangement (10) according to claim 2, wherein said torsional vibration damping arrangement (10) includes a pendulum mass (46).

17. The torsional vibration damping arrangement (10) according to claim 3, wherein said torsional vibration damping arrangement (10) includes a pendulum mass (46).

18. The torsional vibration damping arrangement (10) according to claim 2, wherein phase shifter arrangement (43) and said coupling arrangement (44) form a common wet space (63).

19. The torsional vibration damping arrangement (10) according to claim 2, wherein said phase shifter arrangement (43) and said coupling arrangement (44) form a phase shifter wet space (89) and a coupling arrangement wet space (90).

20. The torsional vibration damping arrangement (10) according to claim 3, wherein said phase shifter arrangement

(43) and said coupling arrangement (44) form a phase shifter wet space (89) and a coupling arrangement wet space (90).

\* \* \* \* \*